United States Patent [19]
Pinkston

[11] Patent Number: 5,387,071
[45] Date of Patent: Feb. 7, 1995

[54] ROTATABLE RECOVERY VEHICLE

[76] Inventor: Donald L. Pinkston, 12295 Spruce La., Perry, Mich. 48872

[21] Appl. No.: 84,806

[22] Filed: Jun. 29, 1993

[51] Int. Cl.⁶ .............................................. B60P 3/12
[52] U.S. Cl. ................................. 414/563; 212/189; 212/232; 280/765.1; 280/766.1
[58] Field of Search ............... 414/563, 540, 547, 550; 280/402, 764.1, 765.1, 766.1, 475; 212/189, 232

[56] References Cited

U.S. PATENT DOCUMENTS

| | | | |
|---|---|---|---|
| D. 205,030 | 6/1966 | Grove | D34/34 |
| D. 205,031 | 6/1966 | Grove | D34/34 |
| D. 301,127 | 5/1989 | Lindblom | D12/14 |
| 2,786,723 | 3/1957 | Harsch | 414/550 X |
| 2,787,383 | 4/1957 | Antos et al. | 212/163 |
| 2,911,111 | 11/1959 | Grove | 212/268 |
| 3,871,685 | 3/1975 | Senelet | 280/766.1 |
| 4,134,500 | 1/1979 | Falch | 414/563 X |
| 4,363,409 | 12/1982 | Laurich-Trost | 414/547 X |
| 4,515,282 | 5/1985 | Sauber | 212/261 |
| 4,586,103 | 2/1986 | Celertiro | 280/765.1 |
| 4,593,474 | 6/1986 | Mayhew | 280/764.1 X |
| 4,609,204 | 9/1986 | Nekola | 280/766.1 |
| 4,632,262 | 12/1986 | Olsen et al. | 280/764.1 X |
| 4,790,710 | 12/1988 | Ayalon | 414/563 |
| 5,064,078 | 11/1991 | Van Staveren | 414/563 X |

FOREIGN PATENT DOCUMENTS

| | | | |
|---|---|---|---|
| 2609631 | 9/1977 | Germany | 212/189 |
| 2837398 | 3/1980 | Germany | 212/189 |
| 220273 | 4/1968 | Sweden | 212/189 |
| 773840 | 5/1957 | United Kingdom | 212/189 |
| 604809 | 4/1978 | U.S.S.R. | 212/189 |
| 1627433 | 2/1991 | U.S.S.R. | 280/765.1 |

OTHER PUBLICATIONS

Vulcan Forge brochure, Vulcan Equipment Company, Inc., dated Apr. 1990.

*Primary Examiner*—David A. Bucci
*Attorney, Agent, or Firm*—Ian C. McLeod

[57] ABSTRACT

A recovery vehicle (10) having a 360° rotatable hoist unit (22) with a boom member (26) mounted onto a vehicle frame (12), is described. The vehicle frame contains a single rear axle (16) having wheels (18) adjacent the sides (12E) of the vehicle frame. A first outrigger assembly (50) is mounted onto the underneath portion (12B) of the vehicle frame adjacent the distal end (12C) of the vehicle frame. The vertical arms (64, 66) of the first outrigger, pivot due to a rotatable yoke (62B) in the end (62A) of the horizontal arm (62) to enable the first outrigger assembly to extend backwards of the distal end of the vehicle frame to act as anchors during pulling by the hoist unit. A second outrigger assembly (52) is mounted between the proximal end (12D) of the vehicle frame and the rear axle.

17 Claims, 7 Drawing Sheets

ROTATABLE RECOVERY VEHICLE

BACKGROUND OF THE INVENTION (1) Field of the Invention

The present invention relates to a recovery vehicle having a 360° rotatable hoist unit and a towing unit which are mounted onto a vehicle frame having a single axle. In particular, the invention relates to a recovery vehicle wherein the 360° rotatable hoist is able to be rotated completely behind the cab of the vehicle with the entire hoist unit spaced above the vehicle frame. The recovery vehicle has stabilizing means adjacent to the front and rear of each side of the axle which act to both anchor and stabilize the vehicle frame during lifting.

(2) Prior Art

The prior art has shown various types of recovery vehicles and recovery units which mount on vehicles some of which are rotatable 360 degrees. Illustrative are U.S. Pat. Nos. 2,787,383 to Antos et al.; 2,911,111 to Grove; 4,134,500 to Sauber; 4,515,282 to Falch; 4,790,710 to Ayalon; 5,064,078 to Van Staveren.

Antos et al describes a rotatable hydraulic crane having a stationary support mounted on the rear of a vehicle between the dual axles and wheels. The vehicle is provided with outriggers and adjustable jacks to give the vehicle greater stability while using the boom crane to swing a load from one side of the vehicle to the other.

Grove describes a mobile crane having a telescopic sectionalized boom which allows loading and unloading and operates without winches. The crane is rotatably mounted onto the chassis of a mobile unit. The telescopic boom is provided with hydraulic cylinders which control the extension and retraction of the boom.

Sauber describes a mobile derrick, aerial man lifts and the like having a boom pivotably mounted on a clevis frame mounted for rotation on a turntable. The turntable is carried on a pedestal secured to the frame of a vehicle.

Falch describes a rescue vehicle having a rotatable crane mounted on a dual rear axle frame wherein a rescue winch is mounted on the crane turret for providing horizontal pulling power.

Van Staveren describes a combination portable hoist, crane and automobile towing mechanism. The device is mounted onto a modified vehicle bumper of a typical automobile. The crane is able to rotate 360° in order to load and unload objects onto the vehicle.

Ayalon describes a multi-purpose recovery vehicle which includes a wheel mounted chassis, a continuously skewing crane assembly and a recovery assembly. The recovery assembly includes an extensible and retractable towing assembly, a retractable anchor assembly, a retractable stabilizing assembly and a winch. The recovery assembly is mounted rearward of and adjacent to the rear wall of the bed of the recovery. vehicle. The skewing crane is mounted onto the chassis of the recovery vehicle which is preferably a conventional three axle heavy duty truck.

The U.S. Pat. Des. Nos. 205,030 to Grove; 205,031 to Grove; and 301,127 to Lindblom; show various designs for recovery units and recovery vehicles.

None of the above references describe a recovery vehicle wherein the hoist unit is rotatable 360° such that the entire hoist unit is able to be positioned over the vehicle frame behind the cab of the recovery vehicle. Further, the references do not describe a single axle recovery vehicle having the ability to lift 32,000 lbs wherein the hoist unit is mounted over the single rear axle. Finally, none of the references show the use of the stabilizer means which can act as an anchor during lifting.

OBJECTS

It is therefore an object of the invention to provide a recovery vehicle wherein the distal end of the vehicle frame is supported by a single axle above which is mounted a 360° rotatable hoist. Further, it is an object of the invention to provide a standard single axle vehicle which has the 360° rotatable hoist unit and a towing unit mounted onto the vehicle frame. Still further, it is an object of the invention to provide a relatively inexpensive recovery vehicle which is able to lift 32,000 lbs. Finally, it is an object of the invention to provide a recovery vehicle having stabilizing means which stabilizes and anchors the vehicle frame during lifting.

DETAILED DESCRIPTION OF THE PREFERRED EMBODIMENT

The present invention relates to a recovery vehicle which comprises a frame means having a distal end and a proximal end and sides between the ends; a cab for the vehicle mounted at the proximal end of the frame means; a rotatable hoist means with a 360° rotatable turntable means mounted on the frame means between the cab and the distal end of the frame means, wherein the hoist means has a boom means supporting a securing means for use in the recovery and wherein the boom means is able to be located behind the cab; a single axle supporting wheels adjacent the sides of the frame means with the axle mounted on an underneath portion of the frame means and beneath turntable means; and four retractable and extensible stabilizer means, two each mounted on a side of the frame means on opposite sides of each of the wheels, so that the stabilizer means can engage the ground to stabilize the vehicle when the boom means is in use.

The first two stabilizing means are mounted on the frame means between the proximal end of the frame means and the axle, adjacent the axle. The second two stabilizing means are mounted at the distal end of the frame means an equal distance from the axles as the first two stabilizer means.

The second two stabilizing means are able to rotate around a horizontal axis of the frame means. The second two stabilizing means are able to be rotated such as to extend behind the recovery vehicle to act as anchors during pulling by the hoist means.

Figure 1:
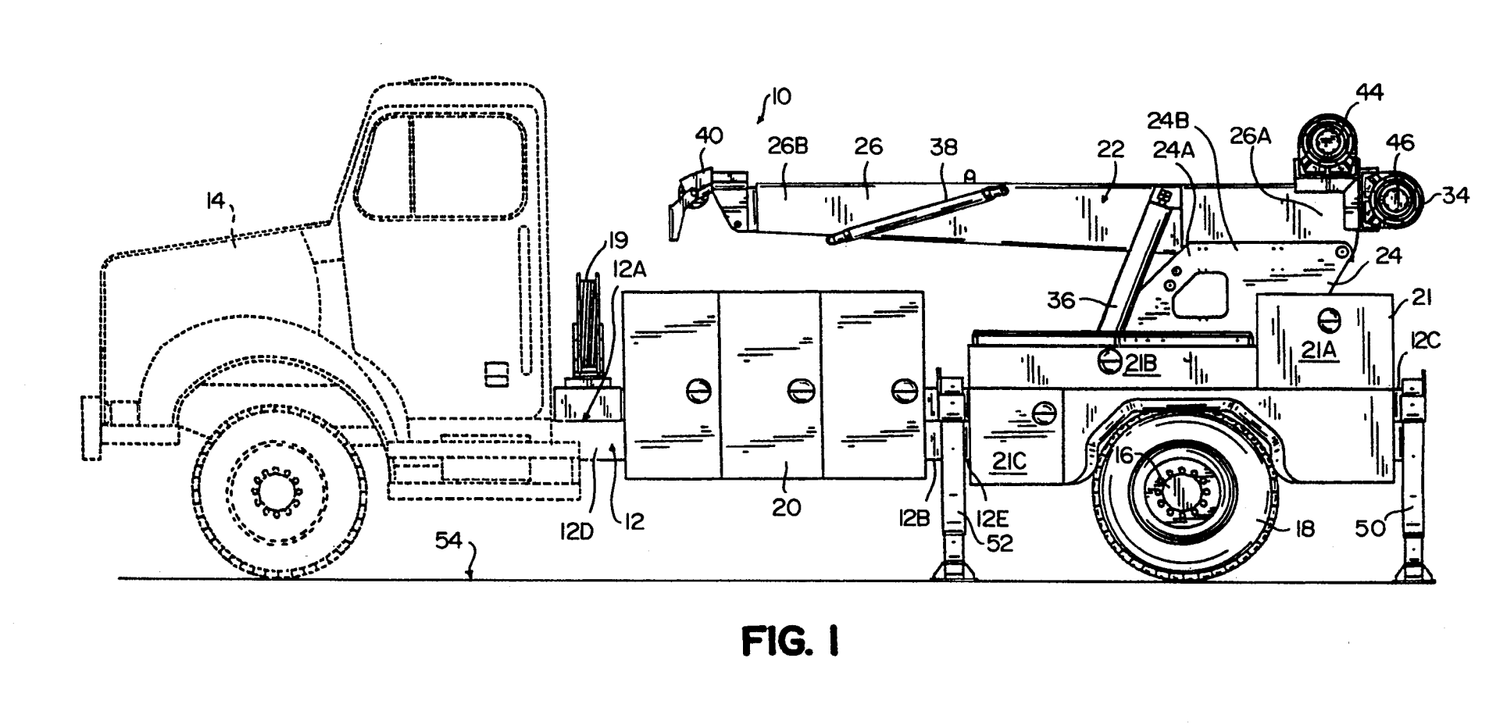
FIG. 1 is a left side prospective view of the recovery vehicle 10 of the present invention showing the vehicle frame 12, the hoist unit 22 with the boom member 26.
Figure 2:
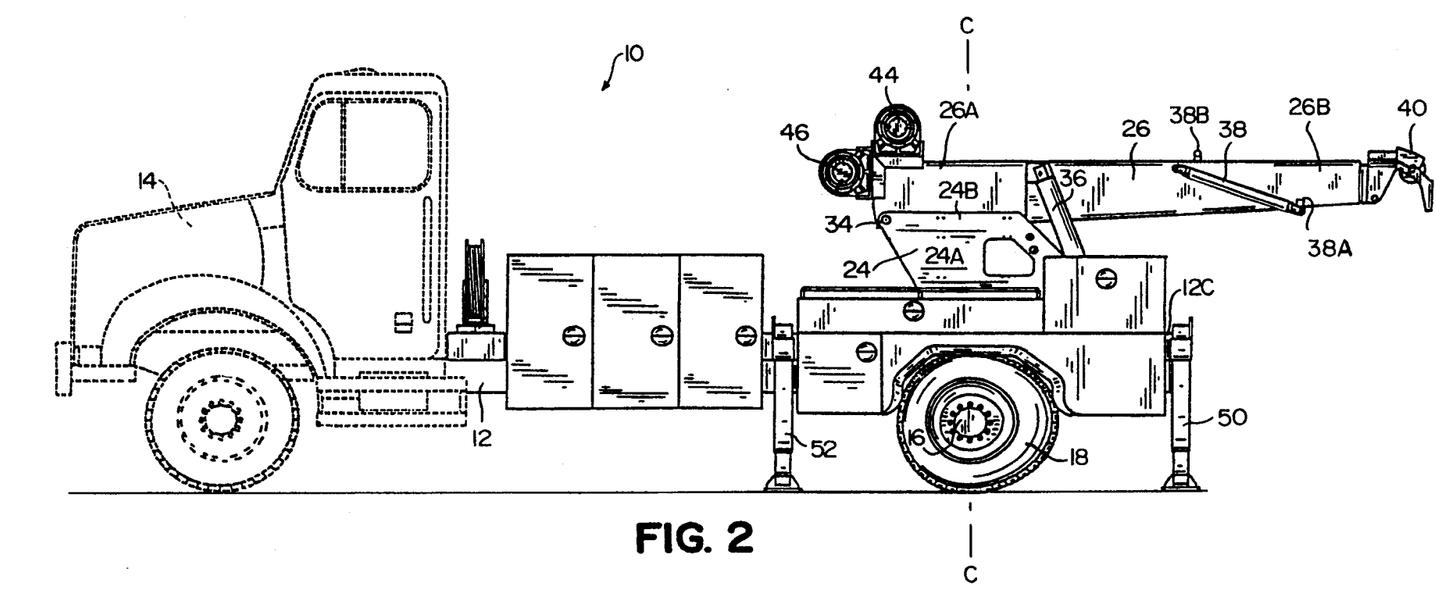
FIG. 2 is a left side prospective view showing the hoist unit 22 rotated 180° on the vehicle frame 12 such that the boom member 26 extends outward beyond the distal end 12C of the vehicle frame 12.
Figure 3:
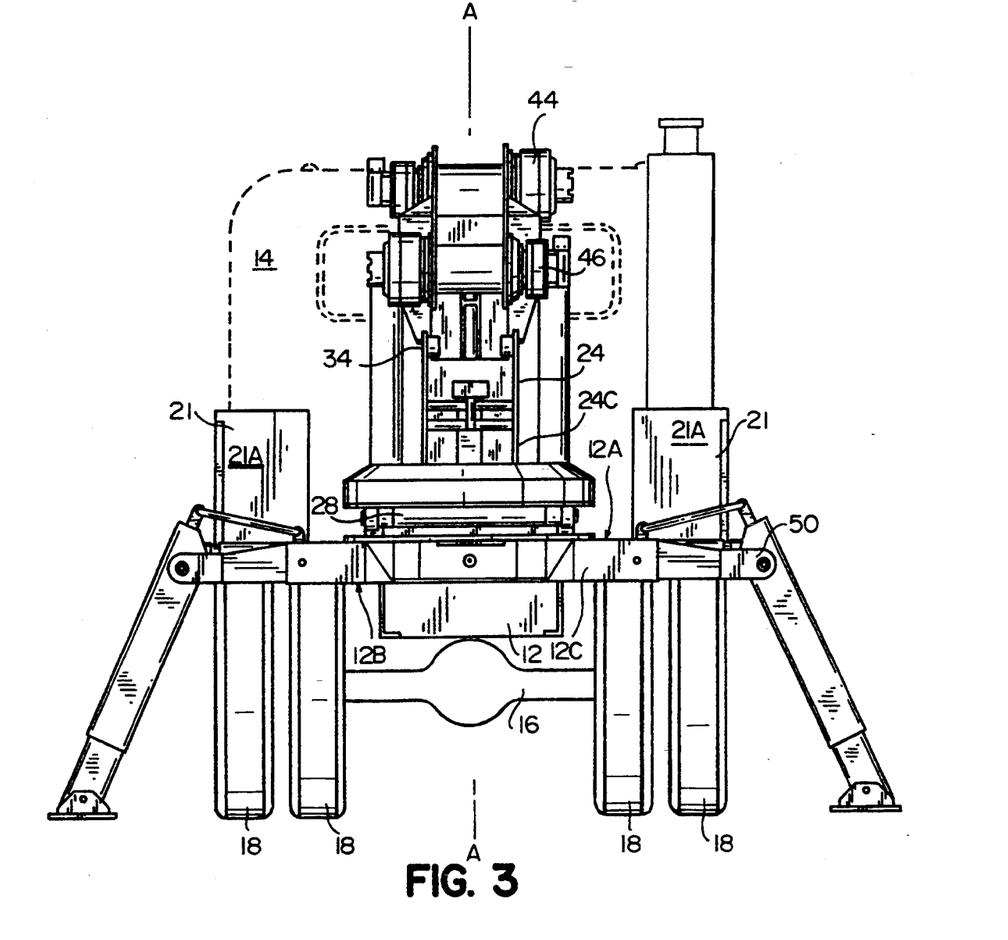
FIG. 3 is a rear view of the recovery vehicle 10 showing the first outriggers 50 in the deployed position, the axle 16 and the wheels 18.

FIGS. 1 to 4 show a recovery vehicle 10 comprised of a hoist unit 22 mounted onto a vehicle frame 12. The vehicle frame 12 is comprised of a top portion 12A and an underneath portion 12B with a distal end 12C and a proximal end 12D having sides 12E therebetween (FIG. 1). A vehicle cab 14 is mounted adjacent the proximal end 12D of the vehicle frame 12 and provides the moving force for the recovery vehicle 10. A single rear axle 16 having wheels 18 is mounted on the underneath portion 12B of the frame 12 near the distal end 12C of the frame 12 such that the wheels 18 are adjacent the sides 12E of the vehicle frame 12 (FIG. 3). In the preferred embodiment, the vehicle frame 12 is similar to standard single axle vehicle frames 12 previously used only for recovery of relatively light loads or light vehicles.

In the preferred embodiment, the vehicle frame 12 is provided with first and second storage compartments 20 and 21 located along the sides 12E of the frame 12 of the vehicle frame 12. The first storage compartments 20 are preferably vertically oriented with respect to the vehicle frame 12 and are located near the proximal end of the vehicle frame 12. The first storage compartments 20 do not interfere with the second outrigger assembly 52 (to be described in detail hereinafter) and are also of a height such as to not interfere with the rotation of the hoist unit 22 over the vehicle frame 12. The second storage compartments 21 are comprised of three separate storage cabinets 21A, 21B and 21C. The first storage cabinet 21A is located adjacent the distal end of the vehicle frame 12 and is mounted onto the top portion 12A of the vehicle frame 12. The height and width of the first cabinet 21A is such that the side plates of the support base 24 and the boom member 26 do not contact the first cabinet 21A during rotation of the hoist unit 22. The second cabinet 21B extends along the top portion 12A of the vehicle frame 12 adjacent the sides 12E between the first cabinet and the second outrigger assembly 52. The third cabinet 21C is mounted onto the side 12E of the frame 12 below the second cabinet 21B between the second outrigger assembly 52 and the wheels 18 of the vehicle axle 16. A reel 19 is preferably mounted to the proximal end 12D of the vehicle frame 12 adjacent the vehicle cab 14. The reel 19 allows compression and hydraulic hoses or winch cables to be stored on the vehicle frame 12.

As shown in FIG. 1, the hoist unit 22 is similar in construction to that of a conventional hoist unit. The hoist unit 22 is comprised of a support base 24 and a boom member 26. The support base 24 is constructed from two spaced apart parallel side plates 24A which have a top portion 24B and a bottom portion 24C wherein the bottom portion 24C of the side plates 24A is mounted onto a rotatable turntable 28. The turntable 28 is able to rotate 360° thus, allowing the hoist unit 22 to rotate 360° horizontally with respect to the vehicle frame 12 (FIG. 2). The support base 24 with the turntable 28 is mounted onto a Z-rail (not shown) mounted on the top portion 12A of the vehicle frame 12 near the distal end 12C of the vehicle frame 12. In the preferred embodiment, the support base 24 is mounted over the rear axle 16 of the vehicle frame 12 such that the rotating axis of the hoist unit 22 is directly in line with the center axis C—C of the rear axle 16 (FIG. 2). In addition, the hoist unit 22 is preferably positioned such that the center of gravity of the hoist unit 22 is directly over the center of the rear axle 16. The mounting of the hoist unit 22 over the center of the rear axle 16 increases the amount of weight the hoist unit 22 is able to lift.

Figure 4:
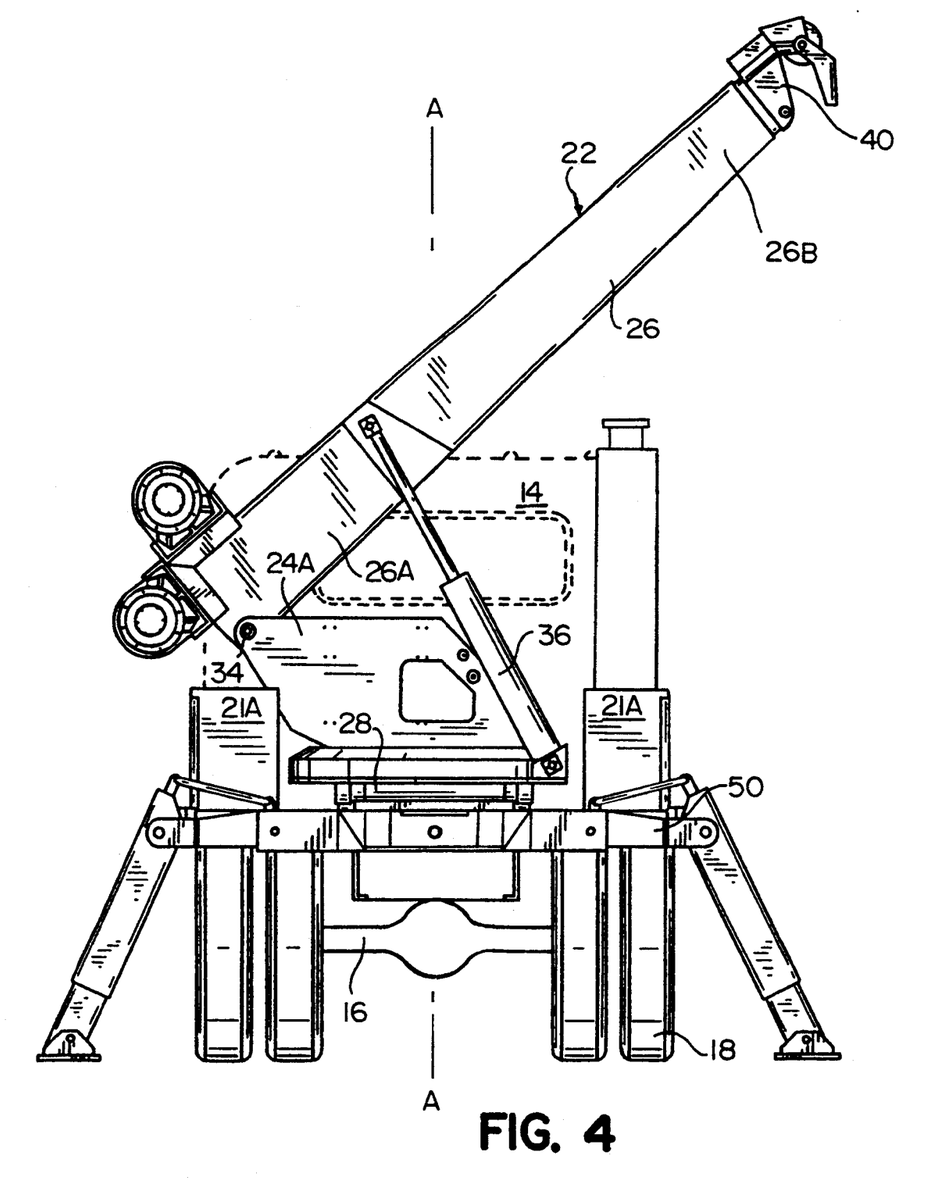
FIG. 4 is a rear view of the recovery vehicle with the hoist unit 22 mounted 90° around the boom member 26 in the elevated position.

The boom member 26 has a proximal end 26A and a distal end 26B. The length of the boom member 26 is such that the boom member 26 mounted onto the support base 24 is able to rotate such as to be located completely behind the cab 14 of the recovery vehicle 10 (FIG. 1). Thus, the hoist unit 22 is able to be positioned completely over the vehicle frame 12 in order to allow easier transportation of the recovery vehicle 10. The proximal end 26A of the boom member 26 is pivotably mounted between the top portion 24B of the side plates 24A of the support base 24. A pivot pin 34 extends through the side plates 24A and through the proximal end 26A of the boom member 26 such that the proximal end 26A of the boom member 26 is pivotably secured to the support base 24. A hydraulic lifting piston 36 is mounted between the bottom portion 24C of the support base 24 and the boom member 26. Preferably, one end of the lifting piston 36 is mounted to the bottom portion 24C of the support base 24 directly opposite the pivot pin 34 and the other end of the lift piston 36 is mounted onto the boom member 26 adjacent the proximal end 26A of the boom member 26 on the side of the boom member 26 opposite the support base 24. The lifting piston 36 enables the boom member 26 to be pivoted upward around the pivot pin 34 such that the distal end 26B of the boom member 26 is extended upward from the vehicle frame 12 (FIG. 4). Thus, the lifting piston 36 enables the hoist unit 22 to lift objects.

In an alternate embodiment (not shown), the boom member 26 is comprised of a first boom arm and a second boom arm. The first and second boom arms and each have a first end and a second end and wherein the first end of the first boom arm forms the proximal end 26A of the boom member 26 and the second end of the second boom arm forms the distal end 26B of the boom member 26. The first end of the second boom arm is telescopically mounted into the second end of the first boom arm such that the boom member 26 is retractable and extensible the length of the second boom arm by a hydraulic cylinder in a known manner. In the embodiment, where the boom does not extend the length of the boom member 26 from the proximal end to the distal end is approximately 10 feet. In the alternate embodiment, the length of the boom member 26 with the second boom fully extended is approximately 18 feet.

A first securing cable (not shown) and a second securing cable (not shown) are attached to the distal end 26B of the boom member 26 in a known manner. The cables extend along the top of the boom member 26, opposite the vehicle frame 12 and are connected to a first winch 44 and second winch 46 mounted onto the proximal end 26A of the boom member 26 opposite the support base 24. The cables are provided with a securing assembly 40 adjacent the distal end 26B of the boom member 26. The securing assembly 40 and the cables enable the disabled vehicle to be secured to the hoist unit 22. The first and second winch 44 and 46 are independently operable such that the cables are able to be used to rotate the disabled vehicle into an upright position in order to make recovery of the disabled vehicle easier.

A pair of support bars 38 (one shown) each having a first end 38A and a second end 38B are pivotably mounted onto the opposite sides of the boom member 26 between the distal end 26B of the boom member 26 and the lifting piston 36. The support bars 38 are preferably identical and therefore only one support bar will be described. The first end 38A of the support bar 38 is permanently pivotably secured to the boom member 26. When not in use, the second end 38B of the support bar 38 is releasably attached to the boom member 26. During use, the second end 38B of the support bar 38 is released from the boom member 26 and is pivoted downward such as to come in contact with the distal end 12C of the vehicle frame 12 in a known manner. The second end 38B of the support bar 38 is provided with a yoke (not shown) which mounts over an eyelet (not shown) located on the distal end 12C of the vehicle frame 12. The yoke and the eyelet are provided with apertures (not shown) which are aligned when the support bar 38 is properly deployed. A securing pin (not shown) is inserted through the apertures to secure the second end 38B of the support bar 38 to the distal end 12C of the vehicle frame 12. The support bars 38 assist in supporting the boom member 26 during pulling by the hoist unit 22. The support bars 38 allow the recovery vehicle 10 to pull a greater load by distributing some of the weight of the load to the vehicle frame 12 and thus, reducing the load on the boom member 26. In the preferred embodiment, the support bar 38 is expandable such that the boom member 26 is able to be supported in a variety of elevated positions.

In the preferred embodiment, a towing unit (not shown) is mounted to the distal end 12C of the vehicle frame 12. The towing unit is mounted such that the hoist unit 22 can rotate freely 360° without interference from the towing unit. Preferably, the towing unit is similar to that used in conventional recovery vehicles 10 such as the one shown in U.S. Pat. No. 4,790,710 to Ayalon.

The vehicle frame 12 is provided with a first and a second outrigger assembly 50 and 52 for stabilizing the vehicle frame 12 during use of the hoist unit 22 (FIGS. 1 and 2). The first outrigger assembly 50 is mounted onto a standard Z-rail (not shown) at the distal end 12C of the vehicle frame 12 (FIGS. 3 and 4). The second outrigger assembly 52 is mounted on the top portion 12A of the vehicle frame 12 between the proximal end 12D and the rear axle 16 of the vehicle frame 12. In the preferred embodiment, the first and second outrigger assemblies 50 and 52 are spaced an equal distance from the rear axle 16 on either side of the rear axle 16. The mounting of the second outrigger assembly 52 is an equal distance from the axle 16 which prevents torsion on the vehicle frame 12 which occurs when the second outrigger assembly 52 is mounted a greater distance from the axle 16. The first and second outrigger assemblies 50 and 52 are positioned such as to provide stability to the vehicle frame 12 during use of the hoist unit 22.

Figure 5:
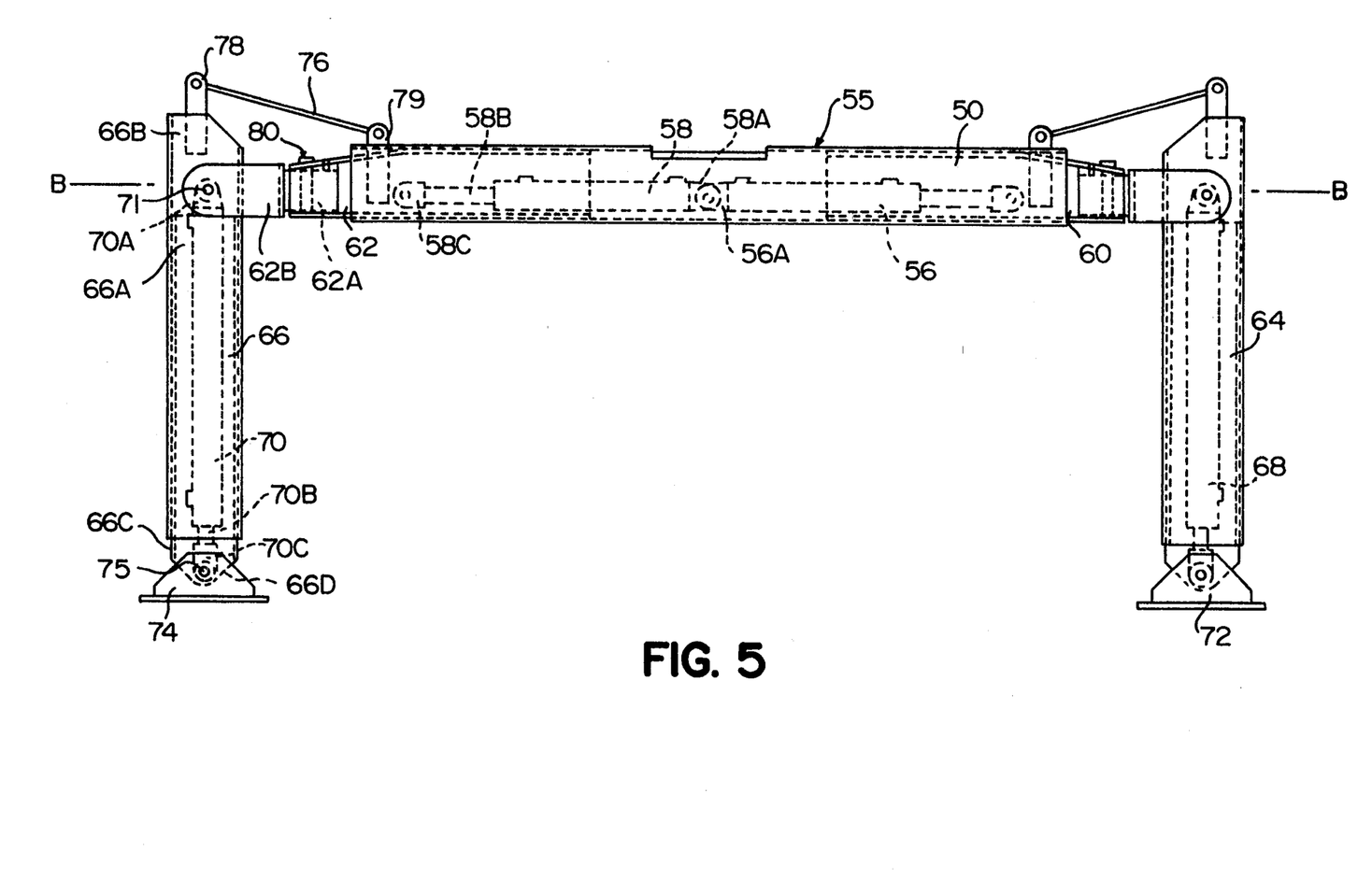
FIG. 5 is a partial view of the first outrigger assembly 50 showing the outer housing 55, the horizontal arms 60 and 62, the vertical arms 64 and 66 and the flat plates 72 and 74.

Preferably, the first outrigger assembly 50 and the second outrigger assembly 52 are essentially constructed the same and therefore only one need be described in detail. As shown in FIG. 5, the first outrigger assembly 50 is preferably comprised of an outer housing 55, a left and right first hydraulic piston 56 and 58, a left and right telescoping horizontal arm 60 and 62, a pivotably mounted left and right vertical arm 64 and 66, a left and right second hydraulic piston 68 and 70 and a left and right flat plate 72 and 74. The outer housing 55 of the first outrigger assembly 50 is preferably mounted horizontally at the distal end 12C of the vehicle frame 12 on the underneath portion 12B of the vehicle frame 12. The left and right first hydraulic pistons 56 and 58 are located inside the outer housing 55 with the first end 56A and 58A of each piston 56 and 58 mounted together near the center of the outer housing 55. Extending outward from the center of the outer housing 54, the left side and the right side of the first outrigger assembly 50 are identical therefore, only the right half will be described iv detail. The right first hydraulic piston 58 is mounted in the outer housing 55 such that the moveable first piston arm 58B expands outward away from the center mounting of the first piston 58. The second end 58C of the first piston 58 is secured to the right telescoping horizontal arm 62 which is telescopically mounted within the outer housing 54. The end 62A of the horizontal arm 62 which extends out of the outer housing 54 is provided with a yoke 62B. The vertical arm 66 has a proximal portion 66A having a proximal end 66B and a distal portion 66C having a distal end 66D. The proximal end 66B of the proximal portion 66A of the vertical arm 66 is mounted between the sides of the yoke 62B. The distal portion 66C of the vertical arm 66 is extendable outward from the proximal portion 66A and is telescopically mounted within the proximal portion 66A of the vertical arm 66. The yoke 62B of the horizontal arm 62 has an aperture (not shown) which is aligned with an aperture (not shown) in the proximal end 66B of the vertical arm 66, when the vertical arm 66 is mounted onto the horizontal arm 62. The second piston 70 is mounted within the vertical arm 66 such that an aperture (not shown) in the second piston end 70A is aligned with the aperture of the vertical arm 66 and the aperture of the yoke 62B. A first pivot pin 71 is inserted through the apertures of the yoke 62B, proximal end 66B of the vertical arm 66 and the second piston end 70A of the second piston 70 to pivotably mount the vertical arm 66 and the second piston 70 onto the yoke 62B of the horizontal arm 62. The moveable second piston arm 70B of the second piston 70 extends away from the first pivot pin 71 and toward the proximal end 66B of the proximal portion 66A of the vertical arm 66. The moveable arm 70B of the second piston 70 extends into the proximal end 66B of the vertical arm 66. The distal end 66D of the vertical arm 66 is provided with an aperture (not shown) which is aligned with an aperture (not shown) in the second end 70C of the moveable arm 70B.

The flat plate 74 is mounted over the distal end 66D of the vertical arm 66 such that the sides of the flat plate 74 extend upward on either side of the distal end 66D. The sides of the flat plate 74 are provided with an aperture (not shown) which aligns with the apertures of the vertical arm 66 and the second piston 70. A second pivot pin 75 is inserted through the apertures of the flat plate 74, the moveable piston arm 70B and the vertical arm 66 to pivotably mount the flat plate 74 onto the vertical arm 66. In the preferred embodiment, a guide rod 76 is attached onto attachment plates 78 and 79 located on the proximal end 66B of the vertical arm 66 and the outer housing 54, respectively. The guide rod 76 pivots the vertical arm 66 in response to the extension or retraction of the telescoping horizontal arm 62. When the horizontal arm 62 is extended, the rod 76 which is of a set length, prevents the proximal end 66B of the vertical arm 66 from moving outward which causes the vertical arm 66 to pivot around the first pivot pin 71 so that the distal end 66D of the vertical arm 66 pivots outward away from the vehicle frame 12. Conversely, when the horizontal arm 62 is retracted, the guide rod 76 prevents the proximal end 66B of the vertical arm 66 from moving inward which causes the vertical arm 66 to pivot around the first pivot pin 71 in the opposite direction which angles the distal end 66D of the vertical arm 66 inward toward the vehicle frame 12. The guide rod 76 is important during deployment of the outrigger assembly 50 and during retraction of the assembly 50 for storage. During deployment, the guide rod 76 ensures that the vertical arm 66 will be angled outward from the vehicle frame 12 to provide maximum support. When the outrigger 50 is being retracted for storage, the guide rod 76 ensures that the vertical arm 66 will be angled upward away from the ground surface 54 such that the outrigger assembly 50 do not contact the ground surface 54 during movement of the recovery vehicle 10.

Figure 6:
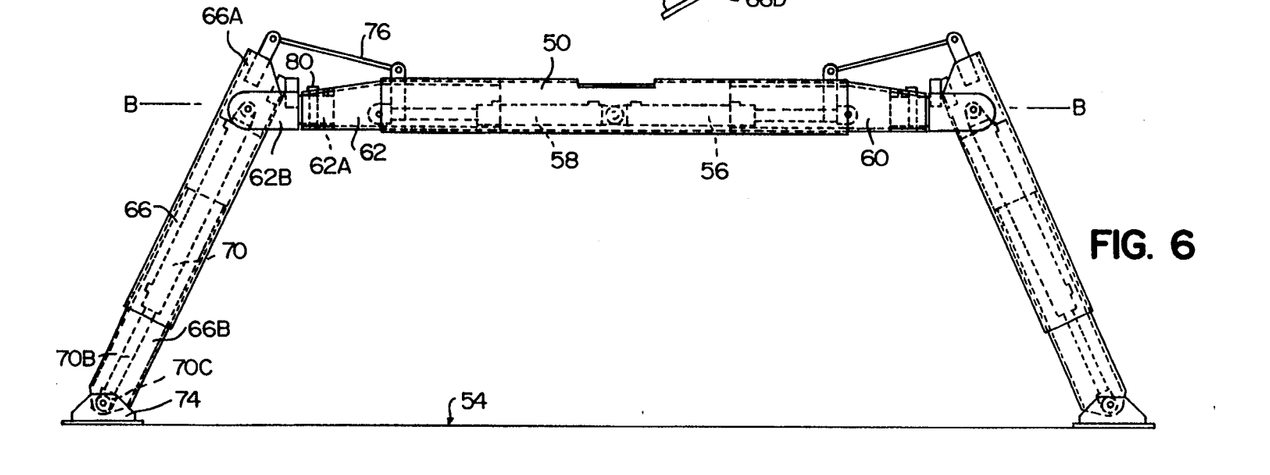
FIG. 6 is a partial view showing the first outrigger 50 in the deployed position with the flat plates 72 and 74 connecting the ground surface 54.
Figure 7:
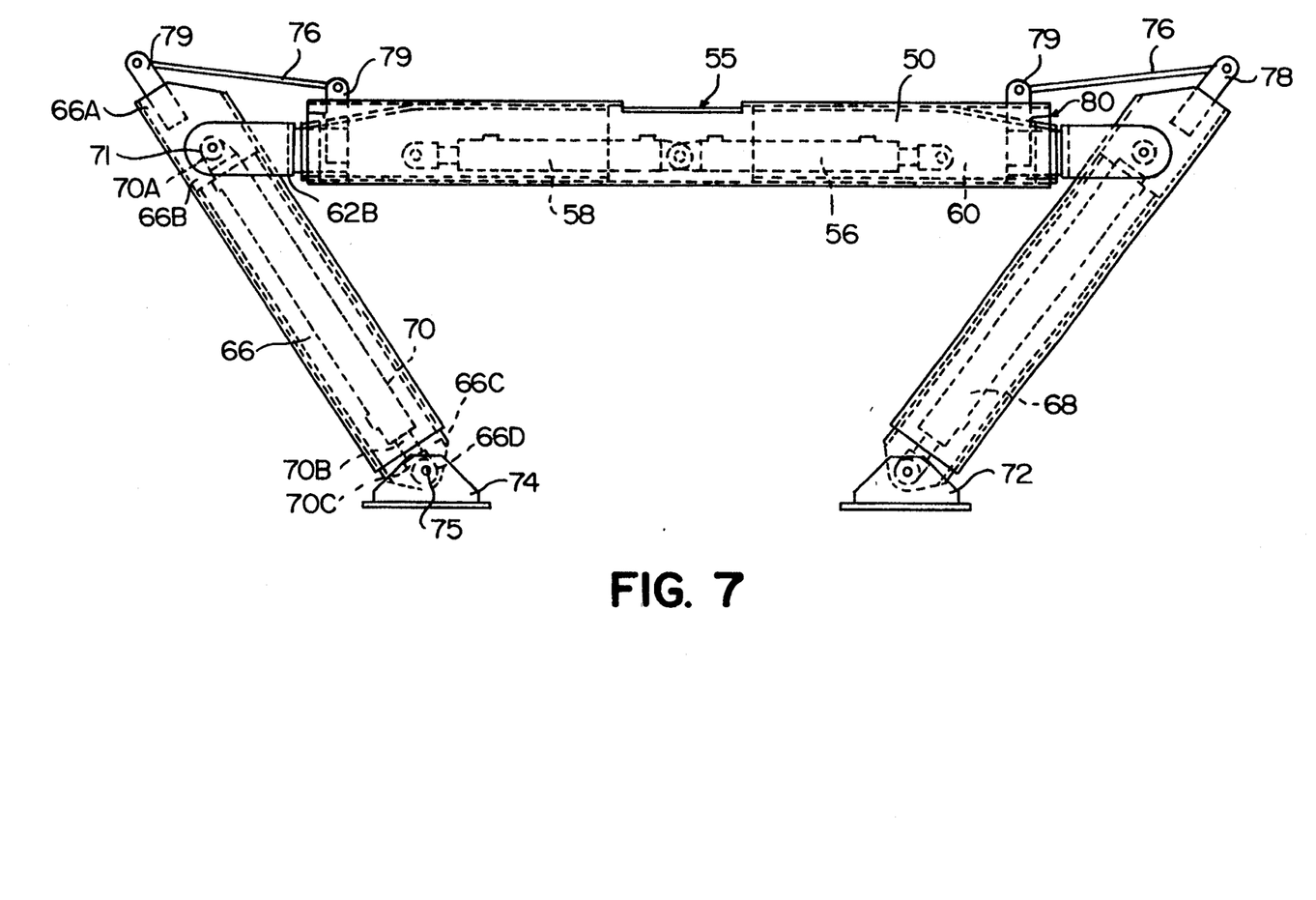
FIG. 7 is a partial view showing the first outrigger 50 in the stored position with the vertical arms 64 and 66 angled toward the outer housing 54.

In use, the outrigger assemblies 50 and 52 are pivoted downward and outward away from the vehicle frame 12 at an angle (FIG. 6). The outrigger assemblies 50 and 52 are lowered until the flat plates 72 and 74 are securely positioned against the ground surface 54 located on either side of the vehicle frame 12. The flat plates 72 and 74 are pivotable around the distal end 66D of the vertical arm 66 such that the entire bottom surface (not shown) of the flat plate 72 and 74 makes contact with the ground surface 54. The outwardly extending outrigger assemblies 50 and 52 form four corners around the hoist unit 22 and thus provide a larger support area for the unit 22. The mounting of the outrigger assemblies 50 and 52 equal distances on either side of the axle 16 allows identical support on all four sides of the axle 16. The outrigger assemblies 50 and 52 stabilize the vehicle frame 12 such as to prevent the vehicle frame 12 from tipping over during use of the hoist unit 22. The outrigger assemblies 50 and 52 also distribute the weight of the hoist unit 22 and the recovery load and thus, decrease the amount of load on the vehicle frame 12. Reducing the load on the vehicle frame 12 and axle 16, reduces the wear and tear on the springs (not shown) of the vehicle frame 12 and thus, increases the life of the recovery vehicle 10. When not in use, the outrigger assemblies 50 and 52 pivot upward toward the underneath portion 12B of the frame 12 such as to be above the ground surface 54 (FIG. 7). Thus, the outrigger assemblies 50 and 52 fold up and out of the way when not in use.

Figure 5A:
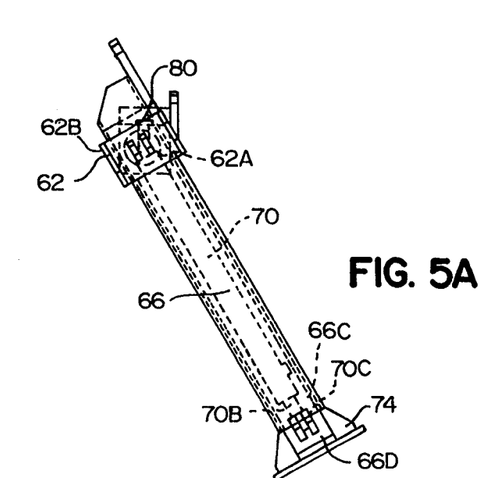
FIG. 5A is a partial view showing the right vertical arms 66 rotated outward and the yoke 62B rotated within the end 62A of the horizontal arm 62.

In the preferred embodiment as shown in FIGS. 5, 5A, 6 and 7, the right and left. vertical arms 64 and 66 of the first outrigger assembly 50 are rotatable to act as anchors during use of the hoist unit 22. The right and left vertical arms 64 and 66 are identical and therefore only the right arm 66 will be described in detail. The yoke 62B of the right horizontal arm 62 of the first outrigger assembly 50 is pivotably mounted onto the end 62A of the horizontal arm 62. The yoke 62B is able to rotate around axis B—B within the end 62A of the horizontal arm 62 to rotate the vertical arm 66 such that the vertical arm 66 is extended behind the distal end 12C of the vehicle frame 12. A securing pin 80 is removeably mounted through the end 62A of the horizontal arm 62 and through the yoke 62B. To change the orientation of the vertical arm 66, the securing pin 80 is removed and the yoke 62B and the vertical arm 66 are rotated around axis B—B. Once the desired angle is achieved, the securing pin 80 is reinserted vertically into the horizontal arm 62 through a different set of apertures (not shown) in the yoke 62B to secure the yoke 62B in the rotated position within the end 62A (FIG. 5A). The first outrigger 50 is able to be pivoted such as to extend outward and downward from the distal end 12B of the vehicle frame 12 rather than from the sides 12E of the vehicle frame 12. The first outrigger assembly 50 thus prevents the recovery vehicle 10 from slipping backwards during pulling by the hoist unit 22 toward the recovery vehicle 10. In the preferred embodiment, to assist in the support of the first outrigger assembly 50 as an anchor, the flat plate 74 is placed in a hole (not shown) dug into the ground surface 54 in order to increase the purchase area of the flat plate 74 and to increase resistance of the first outrigger assembly 50 against backward movement.

IN USE

In use, the recovery vehicle 10 is located adjacent the disabled vehicle to be recovered. The outrigger assemblies 50 and 52 are lowered and positioned on the ground surface 54 on either side of the recovery vehicle 10. If the hoist unit 22 is to be used for pulling toward the distal end of the vehicle frames 12, the first outrigger assembly 50 is pivoted backwards to extend outward from the distal end of the vehicle frame 12 and is placed in holes in the ground surface 54 to allow the outrigger assembly 50 to act as an anchor. The hoist unit 22 is then rotated such that the boom member 26 is located above the disabled vehicle. Preferably when not in use, the hoist unit 22 is rotated such that the boom member 26 is located behind the vehicle cab 14. The cables of the winches 44 and 46 are lowered and the securing assembly 40 is attached to the disabled vehicle. The winches 44 and 46 are then used to tighten the cables such as to secure the disabled vehicle to the securing assembly 40 and the boom member 26. The winches 44 and 46 and cables can also be used to maneuver the disabled vehicle to an upright position, if necessary. Next, the boom member 26 is elevated by the boom piston 36 in order to lift the disabled vehicle off the ground surface. Once the disabled vehicle is lifted, the hoist unit 22 can then be rotated in order to deposit the disabled vehicle into a desirable position. Preferably, the disabled vehicle is positioned such that the disabled vehicle is able to be attached to the towing unit. Finally, the disabled vehicle is attached to the towing unit of the recovery vehicle 10 and the outrigger assemblies 50 and 52 are raised and folded upward toward the vehicle frame 12.

It is intended that the foregoing description be only illustrative of the present invention and that the present invention be limited only by the hereinafter appended claims.

We claim:
1. A recovery vehicle which comprises:
   (a) a frame having a distal end and a proximal end and sides between the ends;
   (b) a cab for the vehicle mounted at the proximal end of the frame;

(c) a rotatable hoist means with a 360° rotatable turntable means mounted on the frame between the cab and the distal end of the frame wherein the hoist means has a telescoping boom means supporting a securing means for use in the recovery and wherein the boom means is able to be located behind the cab for storage;

(d) at least one axle supporting wheels adjacent the sides of the frame with the axle mounted on an underneath portion of the frame and beneath the turntable means; and (e) four telescopically retractable and extensible stabilizer means, two each mounted on a pivot means adjacent a side of the frame on opposite sides of each of the wheels and each stabilizer means is pivotable away from the sides of the frame, so that the stabilizer means can extend and engage the ground to stabilize the vehicle when the boom means is in use and wherein the stabilizer means are pivotable so as to fold toward the underneath portion of the frame and wherein a first two of the stabilizing means are pivotable away from the distal end of the frame so as to engage the ground behind the recovery vehicle.

2. The recovery vehicle of claim 1 wherein a storage means is mounted on the frame adjacent the sides of the frame.

3. The recovery vehicle of claim 2 wherein the storage means are cabinets mounted on the proximal end of the frame.

4. The recovery vehicle of claim 1 wherein each of the stabilizer means is an outrigger.

5. The recovery of claim 1 wherein a second two of the stabilizing means are mounted adjacent the frame between the proximal end of the frame and the axle and adjacent to the axle.

6. The recovery vehicle of claim 1 wherein the hoist means is mounted on the frame directly over the axle so that the center of gravity of the hoist means is over the axle.

7. The recovery vehicle of claim 5 wherein a first two of the stabilizing means are mounted adjacent the frame at the distal end of the frame at an equal distance from the axle as the first two of the stabilizing means.

8. The recovery vehicle of claim 1 wherein the securing means is two winch means mounted on one end of the boom means wherein each winch means is connected to a securing means for securing a disabled vehicle to the recovery vehicle.

9. The recovery vehicle of claim 5 wherein the outriggers are hydraulic.

10. The vehicle of claim 1 wherein each of the pivot means is movable away from the side of the frame means.

11. The vehicle of claim 10 wherein a rod means extends between each of the stabilizer means and the pivot means to change the pivot of the stabilizer means when the pivot means is moved away from and towards the side of the frame.

12. A recovery vehicle which comprises:
(a) a frame having a distal end and a proximal end and sides between the ends;
(b) a cab for the vehicle mounted at the proximal end of the frame;
(c) a rotatable hoist means with a 360° rotatable turntable means mounted on the frame between the cab and the distal end of the frame, wherein the hoist means has a telescoping boom means supporting a securing means for use in the recovery and wherein the boom means is able to be located behind the cab for storage;
(d) an axle supporting wheels adjacent the sides of the frame with the axle mounted on an underneath portion of the frame and beneath the turntable means; and
(e) four telescopically retractable and extensible stabilizer means, two each mounted on a pivot means adjacent a side of the frame on opposite sides of each of the wheels and each stabilizer means is pivotable and movable at a first angle away from the sides of the frame adjacent the stabilizer means, so that the stabilizer means can engage the ground to stabilize the vehicle when the boom means is in use and so that each of the stabilizer means is pivotable and movable at a second angle towards the side of the frame adjacent the stabilizer means and pivotable toward the underneath portion of the frame and retractable to allow the vehicle to be moved and wherein a first two of the stabilizing means are pivotable away from the distal end of the frame so as to engage the ground behind the recovery vehicle.

13. The recovery vehicle of claim 12 wherein a second two of the stabilizing means are mounted adjacent the frame between the proximal end of the frame and the axle and adjacent to the axle.

14. The recovery vehicle of claim 12 wherein the hoist means is mounted on the frame directly over the axle so that the center of gravity of the hoist means is over the axle.

15. The vehicle of claim 12 wherein each of the pivot means is movable away from the side of the frame.

16. The vehicle of claim 15 wherein a rod means extends between each of the stabilizer means and the pivot means to change the pivot of the stabilizer means when the pivot means is moved away from the side of the frame.

17. The recovery vehicle of claim 13 wherein a first two of the stabilizing means are mounted adjacent the frame at the distal end of the frame at an equal distance from the axle as the first two of the stabilizing means.

* * * * *